United States Patent [19]

Akutsu et al.

[11] 4,309,335
[45] Jan. 5, 1982

[54] POLYPHENYLENE OXIDE RESIN COMPOSITION STABILIZER

[76] Inventors: Mitsuo Akutsu, 6-16-30 Aoto Katsushika, Tokyo; Yutaka Nakahara, 406-71 Minamishimoarai, Iwatsuki; Kazumi Kitsukawa, 3-12 Hikonari, Misato, all of Japan

[21] Appl. No.: 76,300

[22] Filed: Sep. 17, 1979

[30] Foreign Application Priority Data

Sep. 18, 1978 [JP] Japan ................. 53-114325

[51] Int. Cl.³ .............................. C08K 5/52
[52] U.S. Cl. ............ 260/45.7 PH; 260/45.8 NT; 260/45.85 B; 260/45.95 G
[58] Field of Search ........... 260/45.7 PH, 45.95 G

[56] References Cited

U.S. PATENT DOCUMENTS

| | | | |
|---|---|---|---|
| 3,103,501 | 9/1963 | Shearer, Jr. et al. | 260/45.95 B |
| 3,115,465 | 12/1963 | Orloff et al. | 260/45.7 PH |
| 3,231,531 | 1/1966 | Buckley et al. | 260/45.75 W |
| 3,305,520 | 2/1967 | Fritz et al. | 260/45.7 PH |
| 3,491,024 | 1/1970 | Kujawa et al. | 260/45.7 PH |
| 3,498,946 | 3/1970 | Calkins | 260/45.7 PH |
| 3,558,554 | 1/1971 | Kuriyama et al. | 260/45.7 PH |
| 3,639,334 | 2/1972 | Holoch | 260/45.7 PH |
| 3,761,541 | 9/1973 | Katchman et al. | 260/45.7 PH |
| 4,187,212 | 2/1980 | Zinke et al. | 260/45.7 PH |
| 4,233,208 | 11/1980 | Spivack | 260/45.7 PH |
| 4,255,321 | 3/1981 | Brussen | 260/45.7 PH |

FOREIGN PATENT DOCUMENTS 1078772  8/1967  United Kingdom .

*Primary Examiner*—Morton Foelak
*Assistant Examiner*—R. A. White

[57] ABSTRACT

Ortho-substituted phenyl acid phosphite stabilizers for polyphenylene oxide resin compositions have the formula

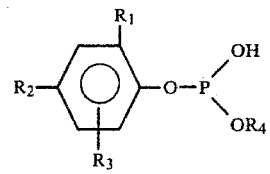

in which $R_1$ is a t-butyl, t-amyl, cyclohexyl or phenyl group; $R_2$ is a hydrogen atom, an alkyl group having 1 to 5 carbon atoms, a cyclohexyl group, or a phenyl group; $R_3$ is a hydrogen atom or a methyl group; and $R_4$ is a hydrogen atom, an alkyl group having 1 to 20 carbon atoms, an ether-alkyl group having 3 to about 70 carbon atoms and 1 to 30 ether groups, an aryl group having 6 to 18 carbon atoms, a cycloalkyl group having 5 to 14 carbon atoms, an aralkyl, alkaryl, or alkoxyaryl group having 7 to 19 carbon atoms, an ethoxylated aryl or alkaryl group having 8 to 78 carbon atoms and 1 to 30 ether groups, or a cycloalkylaryl group having 11 to 19 carbon atoms.

13 Claims, No Drawings

POLYPHENYLENE OXIDE RESIN COMPOSITION STABILIZER

BACKGROUND OF THE INVENTION

This invention relates to polyphenyleneoxide resin compositions having improved resistance to deterioration in mechanical properties upon thermal aging as a result of incorporating new phenyl acid phosphite stabilizers.

Polyphenylene oxide resin compositions also known as polyphenylene ether resin compositions are well known as a class of thermoplastic materials possessing outstanding hydrolytic stability, dimensional stability, and dielectric characteristics over a range of service temperatures extending well above those characteristic of commodity thermoplastics such as the olefin and vinyl chloride polymers. The very properties, however, that make polyphenylene oxide particularly useful also require that the material be fabricated into finished products under severe conditions of processing temperature and shear in the presence of oxygen during the formation of film, fiber, and molded articles. Under these conditions, polyphenylene oxide resin compositions are sensitive to the degradative influence of oxygen and heat and deteriorate in properties unless adequately stabilized.

For example, S. Nakashio in U.S. Pat. No. 3,578,625 of May 11, 1971 has disclosed measurements of the degree of discoloration of a sheet of polyphenylene oxide when pressed for 5 minutes at 270° C.; the amount of oxygen absorbed into a film of 0.01 mm. thickness during 3 hours of heating at 160° C.; and the change in light absorption of such a film during the 160° C. exposure for 3 hours. According to Nakashio, deterioration of polyphenylene oxide as measured in these ways is lessened by the addition of a combination of stabilizers, including at least one kind of hindered phenol and at least one member selected from the group of trialkyl or triaryl thiophosphites, thioethers of carboxylic acid esters, thioethers, and metal alkyl- or metal aryldithiocarbamates.

A Katchman et al in U.S. Pat. No. 3,761,541 of Sept. 25, 1973, after reviewing earlier proposals for improving the resistance of polyphenylene oxide polymer to the degradative effects of oxygen, disclosed a stabilizer combination comprising an alkanolamine alone or in combination with an organic phosphite, an inorganic sulfide, and mixtures thereof. According to Katchman, the phosphites include those of the formula

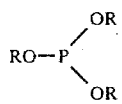

wherein R is independently selected from the group consisting of hydrogen and substituted and unsubstituted hydrocarbon groups containing up to about 20 carbon atoms including saturated and unsaturated, straight, branched chain and mono-cyclic and polycyclic groups. Suitable examples of these compounds are those wherein R is hydrogen, straight or branched chain alkyl of from 1–20 carbon atoms, alkenyl of from 1–20 carbon atoms, (lower)-alkylphenyl, phenyl, halo alkyl of from 1–20 carbon atoms, and substituted phenyl wherein the substituents may include one or more halogen, hydroxy or (lower)alkyl groups. Suitable ex Specific examples are given at column 4 lines 1 to 34 and include many triphosphites such as triphenyl phosphite, trilauryl phosphite, and 2-ethylhexyl di(p-tolyl phosphite), and such diphosphites (also known as hydrogen phosphites or acid phosphites) as bis(2-ethylhexyl) hydrogen phosphite, allyl phenyl hydrogen phosphite, and diphenyl hydrogen phosphite. J. Bussink in U.S. Pat. No. 3,453,231 of July 1, 1969 disclosed a stabilizer combination of a boron compound such as a boron oxide, boric acid, or a boric acid ester, with a phosphorus compound represented by the formula $O_nPXYZ$ in which n is zero or 1, X is selected from OR, SR, and $NR_2$ groups where R is a substituted or unsubstituted alkyl group, and Y and Z are selected from OR', SR', and $NR'_2$ groups where R' is R or hydrogen. S. Yamonouchi in U.S. Pat. No. 3,700,750 of Oct. 24, 1972 disclosed the manufacture of polyphenylene oxide resin compositions by the polymerization of styrene in the presence of a polyphenylene oxide, with or without the presence of a rubber as well. Yamonouchi's compositions are stabilized with a combination of (a) a hindered-phenol, and (b) at least one member of the groups thioether acid esters, trialkyl phosphites, trialkyl thiophosphites, triaryl phosphites, triaryl trithiophosphites, and arylamines, or (c) at least one member of the groups metal dithiocarbamates, metal imidazoline-2-thiolates, and zinc benzothiazole-2-thiolate.

G. McNally in U.S. published patent application B 054,859 of Feb. 17, 1976 has disclosed the stabilization of various polymers including polyphenylene oxides with a combination of an ultraviolet absorber and a thiophosphite of the formula

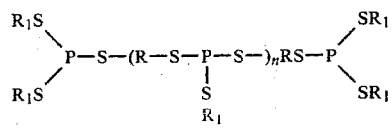

where n is zero or an integer, preferably not over 9, R is a divalent aromatic, aliphatic or cycloaliphatic group, $R_1$ is alkyl, haloalkyl, aryl, haloaryl, alkenyl, haloalkenyl, cycloalkyl or aralkyl. The $R_1$ groups can be the same or different.

V. Abolins in U.S. Pat. No. 4,154,719 of May 15, 1979 disclosed a thermoplastic composition comprising a polyphenylene oxide resin, a rubber modified alkenyl aromatic resin, and a hindered tris-phenol having three hindered phenolic groups attached to a triazine ring; tridecyl phosphite is used as an additional stabilizer ingredient in certain Examples.

SUMMARY OF THE INVENTION

In accordance with this invention, polyphenylene oxide resin compositions are stabilized with a stabilizing quantity of ortho-substituted phenyl acid phosphite having the formula

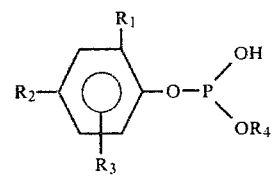

In which $R_1$ is a t-butyl, t-amyl, cyclohexyl or phenyl group; $R_2$ is a hydrogen atom, an alkyl group having 1 to 5 carbon atoms, a cyclohexyl group, or a phenyl group; $R_3$ is a hydrogen atom or a methyl group; and $R_4$ is a hydrogen atom, an alkyl group having 1 to 20 carbon atoms, an ether-alkyl group having 3 to about 70 carbon atoms and 1 to 30 ether groups, an aryl group having 6 to 18 carbon atoms, a cycloalkyl group having 5 to 14 carbon atoms, an aralkyl, alkaryl, or alkoxyaryl group having 7 to 19 carbon atoms, an ethoxylated aryl or alkaryl group having 8 to 78 carbon atoms and 1 to 30 ether groups, or a cycloalkylaryl group having 11 to 19 carbon atoms.

Modest amounts only of these acid phosphites are required, ranging from 0.01 to 5 parts by weight for 100 parts by weight of polyphenylene oxide resin, preferably from 0.05 to 3 parts by weight.

Particularly preferred among the ortho-substituted phenyl acid phosphite stabilizers for polyphenylene oxide resin compositions are novel o-t-butylphenyl and o-t-amylphenyl acid phosphites having two ortho-substituted phenyl groups. These acid phosphites are represented by the above formula in which $R_4$ is a

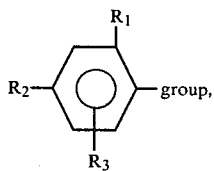

with $R_1$ being a t-butyl or t-amyl group and $R_2$ and $R_3$ being as defined above, provided that these groups can be the same or different at each occurrence within the definition given.

When ortho-substituted phenyl acid phosphite stabilizers of this invention are used in combination with one or more co-stabilizers, the proportions of ortho-substituted phenyl acid phosphite to co-stabilizer can range from 9:1 to 1:9 by weight. Effective co-stabilizers include phenolic antioxidants, organic sulfide-esters, carboxylic acid metal salts and anhydrides.

DESCRIPTION OF PREFERRED EMBODIMENTS

In the formula of the ortho-substituted phenyl acid phosphite stabilizer, $R_2$ alkyl groups can be for example methyl, ethyl, propyl, isopropyl, butyl, isobutyl, sec-butyl, tertbutyl, n-amyl, tert-amyl, iso-amyl and the like. $R_4$ alkyl groups can be these shown for $R_2$ and n-hexyl, isohexyl, n-heptyl, n-octyl, isoctyl, 2-ethylhexyl, 3,5,5-trimethylhexyl, nonyl, decyl, isodecyl, lauryl, tridecyl, mixed $C_{12-15}$ alkyl, stearyl, and eicosyl; $R_4$ cycloalkyl groups can be cyclopentyl, cyclohexyl, cyclcooctyl, cyclododecyl, 4-methylcyclohexyl, and 3,3,5-trimethyl-cyclohexyl; $R_4$ alkaryl groups are tolyl, xylyl, ethylphenyl, butylphenyl, tert-butylphenyl, octylphenyl, isooctylphenyl, tert-octylphenyl, nonylphenyl, 2,4-di-tert-butylphenyl and the like; ether alkyl groups ether linkage are furfuryl, tetrahydrofurfuryl, 5-methylfurfuryl, 2-methylfurfuryl, 3-methoxybutyl, the residual radicals of methyl, ethyl-, isopropyl-, butyl-, isobutyl-, hexyl-, cyclohexyl- or phenyl-Cellosolve, (i.e. the indicated monoether of ethylene glycol) the residual radicals of methyl-, ethyl, isopropyl-, butyl or isobutyl-Carbitol (i.e. the indicated monoether of diethylene glycol); the residual radical of triethylene-glycolmonomethylether, -monoethylether or monobutylether: the residual radical of glycerol-1,2-dimethylether,-1,3-dimethylether, -1,3-diethylether or -1-ethyl-2-propylether; nonylphenoxypolyethoxyethyl, lauroxypolyethoxyethyl and the like, having from one to thirty oxyethylene groups; alkoxyaryl groups are 4-methoxyphenyl, 4-ethoxyphenyl, 3-lauroxyphenyl, 2-methoxy-4-methylphenyl, 2-t-butyl-4-methoxyphenyl, 4-benzyloxyphenyl, 3,4-methylenedioxyphenyl and the like; and cycloalkylaryl groups are 2-cyclohexylphenyl, 2,4-di-cyclohexylphenyl and the like.

Ortho-substituted phenylacid phosphites that can be used according to this invention include bis (2-t-butylphenyl) phosphite, bis(2-t-butyl-4-methylphenyl) phosphite bis(2,4,-di-t-butylphenyl)phosphite, bis (2,4-di-t-butyl-5-methyl-phenyl)phosphite, bis (2-t-butyl-4,6-dimethylphenyl) phosphite, bis (2,4,-di-t-butyl-6-methylphenyl)phosphite, bis (2,4, -di-t-amylphenyl)-phosphite, 2,4-di-t-butylphenyl phenylphosphite, 2,4-di-t-butylphenyl. 2 or 4-cyclohexylphenylphosphite, 2,4, di-t-butyl-phenyl isodecylphosphite and the like. Ortho-substituted phenyl acid phosphite stabilizers of this invention are conveniently prepared by any of several methods. For example a mono-(orthosubstituted phenyl) phosphite such as o-t-amylphenyl phosphite can be prepared by the hydrolysis under mild conditions of o-t-amylphenylphosphorodichloridite o-$C_5H_{11}C_6H_4OPCl_2$ which is obtained by heating o-t-amylphenol with a 100-300% excess of phosphorus trichloride and stripping the unreacted excess. A bis (ortho-substituted phenyl)phosphite such as bis (2,4-di-t-butylphenyl) phosphite can be prepared by transesterification of diphenyl phosphite with 2 moles of the ortho-substituted phenol at 130°-150° C. with subsequent removal of the generated phenol by vacuum distillation. When only one mole of the ortho-substituted phenol is used per mole of diphenyl phosphite, the unsymmetrical phenyl 2,4-di-t-butylphenyl phosphite is obtained. The latter can serve as starting material for the preparation of unsymmetrical alkyl or ether-interrupted alkyl orthosubstituted phenyl phosphites by selective transesterification with an alcohol or ether-alcohol in which the displacement of the unsubstituted phenyl group is favored, suitably by heating at 100°-125° C. for several hours and then stripping phenol.

The chemical reactions taking place in these preparations can be summarized by the following equations, in which for convenience Ar is used to symbolize the ortho-substituted phenyl group

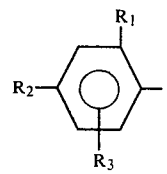

in which $R_1$, $R_2$, and $R_3$ are as previously defined.

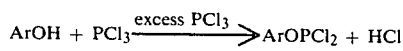    A.

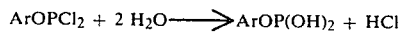

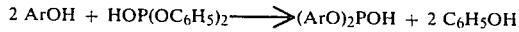    B.

-continued

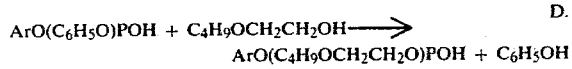

Synthesis Examples 1 to 3: Preparation of Bis(2,4-di-t-butylphenyl phosphite), bis(2-t-butyl-4-methylphenyl)-phosphite and Bis(2,4-di-t-amylphenylphosphite. A mixture of 234 g diphenylphosphite and 412 g 2,4-di-t-butylphenol was stirred and heated for 4 hours at 140°–150° C. at atmospheric pressure, after which the pressure was gradually reduced to 15 min. and the phenol produced by the reaction was allowed to distil from the mixture. There resulted 440 g of a pale yellow residue product of bis (2,4-di-t-butylphenyl) phosphite, which crystallizes on cooling and had melting point 96° C.

By similar procedures bis(2-t-butyl-4-methylphenyl) phosphite and bis (2,4-di-t-amylphenyl) phosphite were obtained, the former a viscous oil that set to a glass on keeping at 25° C. and the latter a viscous yellow oil. When a phenolic antioxidant is used together with an ortho-substituted phenyl acid phosphite according to this invention to stabilize a polyphenylene oxide resin composition, the amount of phenolic antioxidant is preferably 0.01 to 2 parts by weight per 100 parts by weight of polyphenylene oxide resin.

Useful phenolic antioxidants include 2,6-di-t-butyl-p-cresol, 4,4'-n-butylidenebis (2-t-butyl-5-methylphenol), 1,1,3-tris(2-methyl 4-hydroxy-5-t-butylphenyl)butane, tris(3,5, di-t-butyl-4-hydroxybenzyl)isocyanurate, 1,3,5-tris(3,5-di-t-butyl-4-hydroxybenzyl)-2,4,6,-trimethylbenzene, esters of β-(3,5-di-t-butyl-4-hydroxphenyl) propionic acid with mono-tetrahydric alcohol (e.g. methanol, decanol, stearyl alcohol, ethyleneglyol, thiodiethyleneglycol, 1,6-hexanediol, tris(2-hydroxyethyl)-isocyanurate, pentaerythritol):

A comprehensive disclosure of phenolic stabilizers that can be used according to this invention is given by M. Minagawa in U.S. Pat. No. 3,849,370, column 16 line 49 to column 21 line 8, and is here incorporated by reference.

When an organic sulfide-ester is used to stabilize a polyphenylene oxide resin composition together with an ortho-substituted phenyl acid phosphite according to this invention, the amount of organic sulfide-ester is preferably 0.1 to 1 part by weight per 100 parts of polyphenylene oxide resin. Organic sulfideesters that can be used include dilauryl thiodipropionate, dimyristyl thiodipropionate, distearyl thiodipropionate, and pentaerythritol tetra (laurylmercaptopropionate) as individual examples of the class of thiodipropionate esters disclosed by M. Minagawa in U.S. Pat. No. 3,849,370, column 21 line 9 to column 22 line 65, and the class of polyhydric alcohol 3-alkylthiopropionic acid esters disclosed by M. Minagawa in U.S. Pat. No. 4,105,629, column 9 line 47 to column 10 line 52. These disclosures are here incorporated by reference.

When the ortho-substituted phenyl acid phosphite stabilizers are used together with an acid anhydride to stabilize polyphenylene oxide resin compositions according to this invention, the amount of acid anhydride is preferably 0.02 to 1 parts by weight for 100 parts of polyphenylene oxide resin. Acid anhydrides that can be used can be open chain anhydrides such as benzoic anhydride and palmitic anhydride, or cyclic anhydrides where the anhydride group is part of a ring structure, such as phthalic anhydride, trimellitic anhydride, pyromellitic dianhydride, 1-phenylethylsuccinic anhydride, and polyanhydride from the copolymerization of maleic anhydride with styrene, alpha-pinene, or abietic acid.

When the ortho-substituted phenyl acid phosphite stabilizers are used together with calcium, magnesium, barium, or zinc salt of a carboxylic acid to stabilize polyphenylene oxide resin compositions according to this invention, the amount of such salt is preferably 0.02 to 0.5 parts by weight for 100 parts of polyphenylene oxide resin. Carboxylic acids that can be used are preferably non-nitrogenous monocarboxylic acids having from 6 to 24 carbon atoms including oleic acid, lauric acid, anisic acid, and monomethyl phthalate. A comprehensive disclosure of carboxylic acids that can be used in the form of the indicated metal salts by M. Minagawa in U.S. Pat. No. 4,134,868, column 4 lines 5 to 49 is here incorporated by reference.

The polyphenylene oxide resin composition stabilized according to this invention with an ortho-substituted phenyl acid phosphite comprises a polyphenylene oxide resin represented by the formula

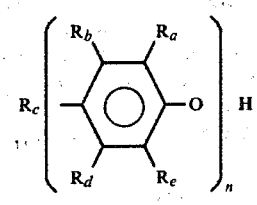

in which the oxide oxygen atom of one unit is linked to the benzene ring of the following unit, n is an integer from 50 to about 200, and $R_a$ is a hydrogen atom, a lower alkyl group, an alkoxy or haloalkoxy group, or a haloalkyl group having 2 to 4 carbon atoms; $R_b$, $R_d$ and $R_e$ each independently can be a halogen atom or a group represented by $R_a$; and $R_c$ is an atom of hydrogen or halogen.

A particularly preferred polyphenylene oxide resin is poly(2,6-dimethylphenylene) oxide, having the above formula in which $R_a$ and $R_e$ are methyl while $R_b$ and $R_d$ are hydrogen.

Polyphenylene oxide resins are the products of an oxidative polymerization of a phenol monomer having the above formula in which n=1. Several methods of preparation have been disclosed by A. Hay, G. Stamatoff, and later workers, concisely summarized by V. Abolins in U.S. Pat. No. 4,123,475 at column 1 lines 20–30 and here incorporated by reference. To take full advantage of the outstanding properties of these resins, the resin composition usually contains one or more blending resins, such as a styrene polymer, polycarbonate, polysulfone, nylon, polyolefin, or elastomer.

The composition can be a physical blend of individually prepared polyphenylene oxide resin and blending resin. The composition can also contain graft copolymers resulting from the preparation of polyphenylene oxide by polymerization of the monomer phenol in the presence of the blending resin, or from the preparation of the blending resin by polymerization of its monomer in the presence of a polyphenylene oxide resin.

Particularly preferred blending resins are styrene resins, which provide useful polyphenylene oxide resin compositions containing as little as 10% and as much as 99% polyphenylene oxide. Preferred proportions of polyphenylene oxide resin to styrene resin in polyphenylene oxide resin compositions containing a styrene resin and stabilized with an orthosubstituted phenyl acid phosphite according to this invention range from 2:1 to 1:2.

The term "styrene resin" is used broadly to indicate resins having at least 25% by weight of repeating units derived from styrene itself or a derivative substituted at the alpha position and/or the benzene ring by halogen or lower alkyl, as defined by V. Abolins in U.S. Pat. No. 4,123,475 at column 3 lines 11 to 45 and here incorporated by reference.

The manner in which ortho-substituted phenyl acid phosphite stabilizers of this invention or combinations thereof with other known stabilizers are compounded with polyphenylene oxide resin to provide stabilized polyphenylene oxide resin compositions is not critical, and can follow conventional procedures. Suitably, the stabilizer can be blended with dry resin powder in a ribbon blender or high intensity mixer of the Henschel or Papenmeier type along with other conventional compounding ingredients such as colors, reinforcing fibers, flame retardants, and the blend passed through an extruder (usually maintained at 260°–310° C.) and subsequently pelletized to provide material suitable for molding. Alternatively, solution, slurry, and emulsion techniques can also be used to disperse the stabilizer in the polymer to be stabilized.

The following Examples illustrate the invention in detail.

EXAMPLE 1

50 parts by weight of poly(2,6-dimethyl-1,4-phenyleneoxide) having intrinsic viscosity of 0.56 dl/g in chloroform, 47.5 parts by weight of polystyrene, 2.5 parts by weight of polycarbonate, 3.0 parts by weight of titanium oxide and 0.5 parts by weight of stabilizer were thoroughly mixed in a Henschel mixer, pelletized and then injection molded at 280° C. into test pieces.

After test pieces were heated in a Geer oven at 125° C. for 100 hrs, retention rates of elongation and Izod impact strength were evaluated, and the results are reported in Table-1.

TABLE 1

| No. | Stabilizers | Retention rate (%) Elongation | Izod impact Strength |
|---|---|---|---|
| Control | | | |
| 1-1 | Tridecylphosphite | 32 | 40 |
| 1-2 | Dibutylphosphite | 16 | 22 |
| 1-3 | Diphenylphosphite | 25 | 37 |
| Example | | | |
| 1-1 | Bis(2,4-di-t-butylphenyl)phosphite | 63 | 75 |
| 1-2 | Bis(2-t-butyl-4-methylphenyl)phosphite | 65 | 72 |
| 1-3 | Bis(2-t-butyl-4,6-dimethylphenyl)phosphite | 61 | 73 |
| 1-4 | Bis(2,4-di-t-butyl-5-methylphenyl)phosphite | 61 | 72 |
| 1-5 | Bis(2-t-amylphenyl)phosphite | 57 | 66 |
| 1-6 | Bis(2-cyclohexylphenyl)phosphite | 58 | 68 |
| 1-7 | Bis(2-phenylphenyl) | 55 | 65 |
| 1-8 | Bis(2,4-di-cyclohexylphenyl)phosphite | 57 | 66 |
| 1-9 | 2,4-di-t-butylphenyl . phenylphosphite | 57 | 69 |
| 1-10 | 2,4-di-t-butylphenyl . dodecylphosphite | 55 | 67 |
| 1-11 | 2-t-butyl-4-methylphenyl . nonylphenylphosphite | 55 | 68 |
| 1-12 | 2-t-butyl-4-methylphenyl phosphite | 53 | 64 |
| 1-13 | 2-cyclohexylphenyl . cyclohexylphosphite | 52 | 63 |
| 1-14 | 2,4-di-t-butyl-5-methylphenyl . butoxyethylphosphite | 56 | 68 |
| 1-15 | 2,4-di-t-butyl-5-methylphenyl . benzylphosphite | 55 | 65 |

The results of these tests show that the mechanical properties of polyphenylene oxide samples containing ortho-substituted phenyl acid phosphite stabilizers according to this invention are remarkably well preserved after the thermal aging test, while samples containing a conventional trialkyl phosphite stabilizer or an acid phosphite that is not an ortho-substituted phenyl acid phosphite are significantly deteriorated.

EXAMPLE 2

100 parts by weight of poly(2,6-dimethyl-1,4-phenyleneoxide) having intrinsic viscosity of 0.60 dl/g at 25° C. in chloroform and 0.3 parts by weight of stabilizer were thoroughly mixed and then pressed into test pieces at 300° C.

Test pieces were heated in oxygen current at 160° C. for 3 hours, quantities of absorbed oxygen by pieces were measured, and the results are reported in Table-2.

TABLE 2

| No. | Stabilizers | Quantities of absorbed $O_2$ ml/g |
|---|---|---|
| Control | | |
| 2-1 | Tris(nonylphenyl)phosphite | 0.35 |
| 2-2 | Di(p-t-butylphenyl)phosphite | 0.31 |
| 2-3 | Dioctylphosphite | 0.47 |
| Example | | |
| 2-1 | Bis(2,4-di-t-butylphenyl)phosphite | 0.08 |
| 2-2 | Bis(2-t-butyl-4-methylphenyl)phosphite | 0.10 |
| 2-3 | Bis(2,4-di-t-amylphenyl)phosphite | 0.11 |
| 2-4 | Bis(2,4-di-t-butyl-6-methylphenyl)phosphite | 0.09 |
| 2-5 | Bis(2-cyclohexylphenyl)phosphite | 0.13 |
| 2-6 | Bis(2-phenylphenyl)phosphite | 0.16 |
| 2-7 | 2,4-di-t-butylphenylphosphite | 0.13 |
| 2-8 | 2-t-butyl-4-phenylphenylphosphite | 0.14 |
| 2-9 | 2,4-di-t-butylphenyl . isodecylphosphite | 0.15 |
| 2-10 | 2,4-di-t-butylphenyl . octylphenylphosphite | 0.12 |
| 2-11 | 2-t-butyl-4-methylphenyl . phenylphosphite | 0.14 |
| 2-12 | 2-t-butylphenyl . 4-methoxyphenylphosphite | 0.15 |
| 2-13 | 2,4-di-t-butyl-5-methylphenyl . isooctylphosphite | 0.13 |
| 2-14 | 2-t-butyl-4,6-dimethylphenyl . phenylphosphite | 0.14 |

The results of this test show the remarkable effectiveness of orthosubstituted phenyl acid phosphite stabilizers according to this invention in minimizing the deleterious absorption of oxygen by a polyphenylene oxide resin. The absence of a blending resin in this example confirms that the ortho-substituted phenyl acid phosphites exert their stabilizing effect on the polyphenylene oxide resin itself.

The polyphenylene oxide compositions of controls 2-1, 2-2, and 2-3 each absorbed more than 0.3 ml. oxygen per gram and became highly colored, while all the samples according to this invention absorbed less than 0.2 ml oxygen per gram and were colorless or at most very slightly yellowed.

We claim:

1. A polyphenylene oxide resin composition having enhanced resistance to deterioration of mechanical properties during thermal aging, comprising a polypenylene oxide resin and a stabilizing amount of orthosubstituted phenyl acid phosphite represented by the formula

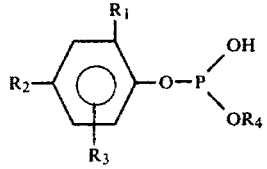

in which $R_1$ is a t-butyl, t-amyl, cyclohexyl or phenyl group; $R_2$ is a hydrogen atom, an alkyl group having 1 to 5 carbon atoms, a cyclohexyl group, or a phenyl group; $R_3$ is a hydrogen atom or a methyl group; and $R_4$ is a hydrogen atom, an alkyl group having 1 to 20 carbon atoms, an ether-alkyl group having 3 to about 70 carbon atoms and 1 to 30 ether groups, an aryl group having 6 to 18 carbon atoms, a cycloalkyl group having 5 to 14 carbon atoms, an aralkyl, alkaryl, or alkoxyaryl group having 7 to 19 carbon atoms, an ethoxylated aryl or alkaryl group having 8 to 78 carbon atoms and 1 to 30 ether groups, or a cycloalkylaryl group having 11 to 19 carbon atoms.

2. A polyphenylene oxide resin composition according to claim 1 in which the quantity of acid phosphate is 0.01 to 5 parts by weight per 100 parts by weight of resin.

3. A polyphenylene oxide resin composition according to claim 1 in which in the formula of the acid phosphite $R_1$ is a t-butyl group.

4. A polyphenylene oxide resin composition according to claim 3 in which the acid phosphite is bis (2,4-di-t-butylphenyl)phosphite.

5. A polyphenylene oxide resin composition according to claim 3 in which the acid phosphite is bis (2-t-butyl-4-methylphenyl)phosphite.

6. A polyphenylene oxide resin composition according to claim 1 in which the polyphenylene oxide is represented by the formula

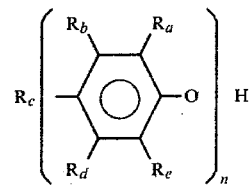

in which $R_a$ is a hydrogen atom, or a lower alkyl, alkoxy, phenyl, haloalkyl, or haloalkoxy group; $R_b$, $R_d$ and $R_e$ are each independently a halogen atom or $R_a$, and $R_c$ is an atom of hydrogen or halogen, and n is an integer from 50 to about 200.

7. A polyphenylene oxide resin composition according to claim 6 in which $R_a$ and $R_e$ are methyl.

8. A polyphenylene oxide resin composition according to claim 6 comprising as an additional ingredient a styrene polymer.

9. A polyphenylene oxide resin composition according to claim 8 in which the proportions of polyphenylene oxide to styrene polymer range from 3:1 to 1:3.

10. A polyphenylene oxide resin composition according to claim 8 in which the acid phosphite is bis (2,4-di-t-butylphenyl)phosphite.

11. A polyphenylene oxide resin composition according to claim 1 in which in the formula of the acid phosphite $R_4$ is a hydrogen atom.

12. A polyphenylene oxide resin composition according to claim 11 in which the acid phosphite is 2,4-di-t-butylphenyl phosphite.

13. A polyphenylene oxide resin composition according to claim 11 in which the acid phosphite is 2-t-butyl-4-methylphenyl phosphite.

* * * * *